United States Patent [19]

Bonnet

[11] Patent Number: 5,655,643
[45] Date of Patent: Aug. 12, 1997

[54] HIGH SPEED, COMPOUND, BELTED DIVERTER AND METHOD OF OPERATING SAME

[75] Inventor: Henri Bonnet, Atlanta, Ga.

[73] Assignee: United Parcel Service of America, Inc., Atlanta, Ga.

[21] Appl. No.: 646,870

[22] Filed: May 8, 1996

[51] Int. Cl.$^6$ .................................................. B65G 47/46
[52] U.S. Cl. ......................................................... 198/370.08
[58] Field of Search .................................... 198/367, 368, 198/370.01, 370.02, 370.07, 370.08

[56] References Cited

U.S. PATENT DOCUMENTS

| | | |
|---|---|---|
| 1,729,671 | 10/1929 | Bell-Irving et al. . |
| 1,909,481 | 5/1933 | Allen . |
| 2,649,187 | 8/1953 | Eggleston ........................ 198/370.08 |
| 3,026,988 | 3/1962 | Fisk . |
| 3,093,236 | 6/1963 | McLaughlin ................ 198/370.08 X |
| 3,104,755 | 9/1963 | Zuercher . |
| 3,348,678 | 10/1967 | Flowers . |
| 3,743,090 | 7/1973 | Brown et al. . |
| 3,835,979 | 9/1974 | Calvert et al. . |
| 4,295,559 | 10/1981 | Neal et al. . |
| 4,364,465 | 12/1982 | Kraft et al. . |
| 4,474,295 | 10/1984 | Braschos ...................... 198/370.07 X |
| 4,711,357 | 12/1987 | Langenbeck et al. . |
| 4,732,260 | 3/1988 | Canziani . |
| 4,850,471 | 7/1989 | Annas, Sr. et al. ............ 198/370.08 X |
| 5,421,446 | 6/1995 | Koch et al. . |
| 5,423,409 | 6/1995 | Wipf . |

FOREIGN PATENT DOCUMENTS

| | | |
|---|---|---|
| 1316-954-A | 6/1987 | U.S.S.R. . |
| 1514708 | 10/1989 | U.S.S.R. . |

*Primary Examiner*—James R. Bidwell
*Attorney, Agent, or Firm*—Jones & Askew, LLP

[57] ABSTRACT

A conveyor diverter that is capable of engaging objects, such as packages of varying size and weight, traveling at high speed along a conveyor, without dataaging impact, and can reliably divert such objects off the conveyor to an output location without any decrease in conveyor speed. The diverter may include a frame pivotally mounted for rotation about an axis adjacent to the conveyor, a belt mounted about a pair of pulleys, one of which is movable against a spring. The belt deforms upon contact by the articles. After an article and the diverter come into engagement with each other, the swinging speed of the diverter, and, optionally, the speed of the diverter belt, may be accelerated to increase the exit speed of the article.

20 Claims, 4 Drawing Sheets

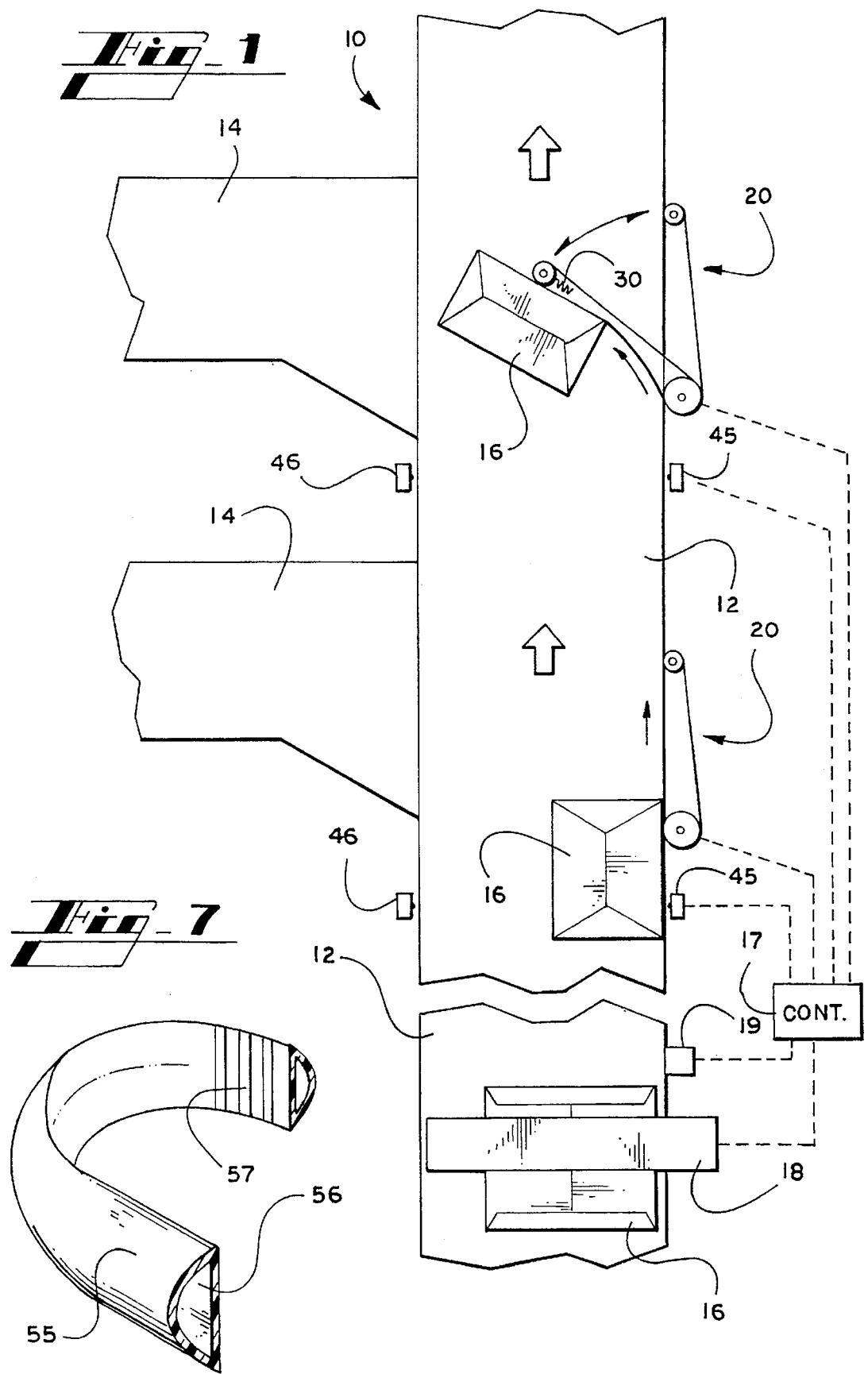

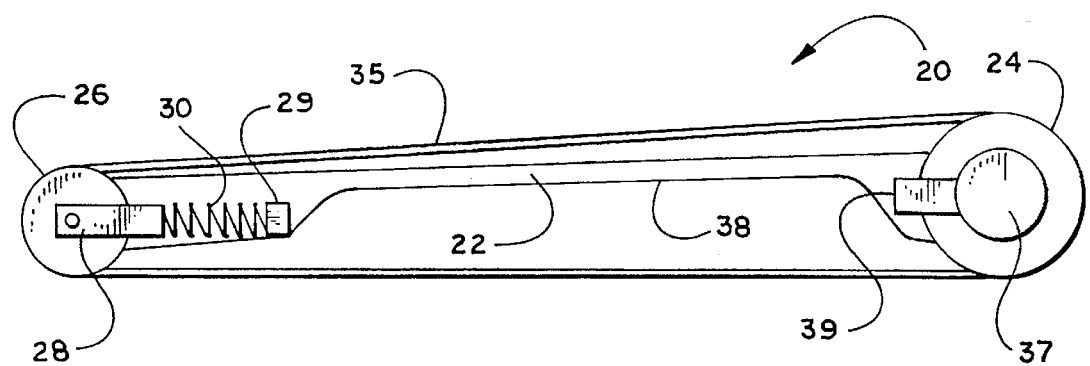
Fig_3
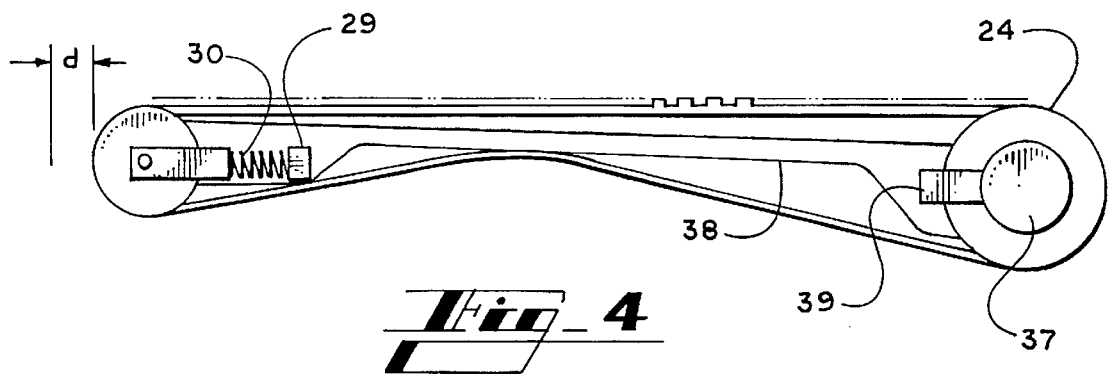
Fig_4
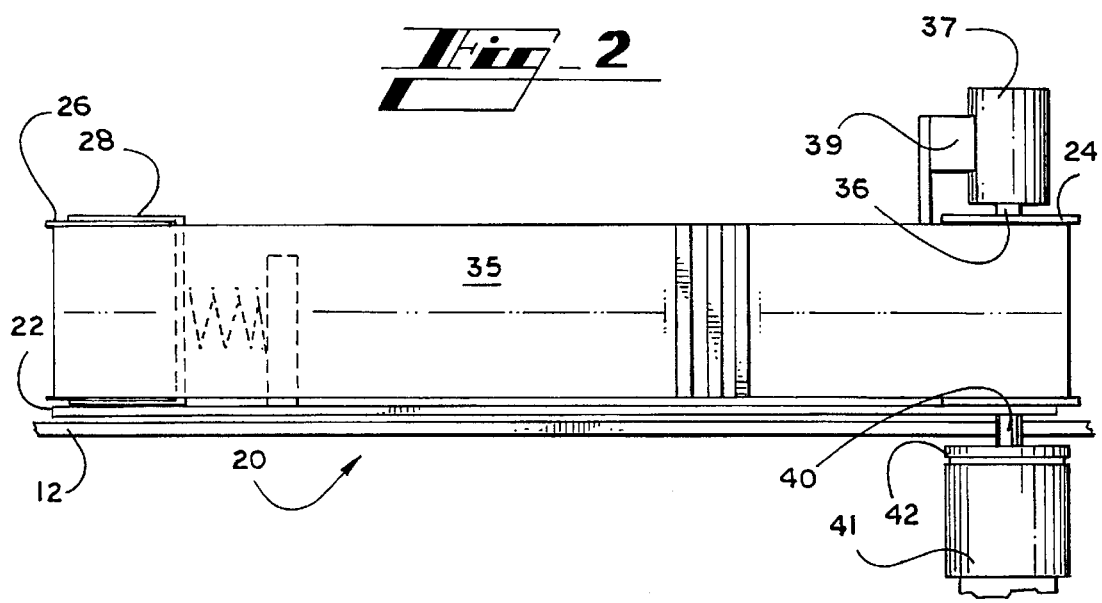
Fig_2

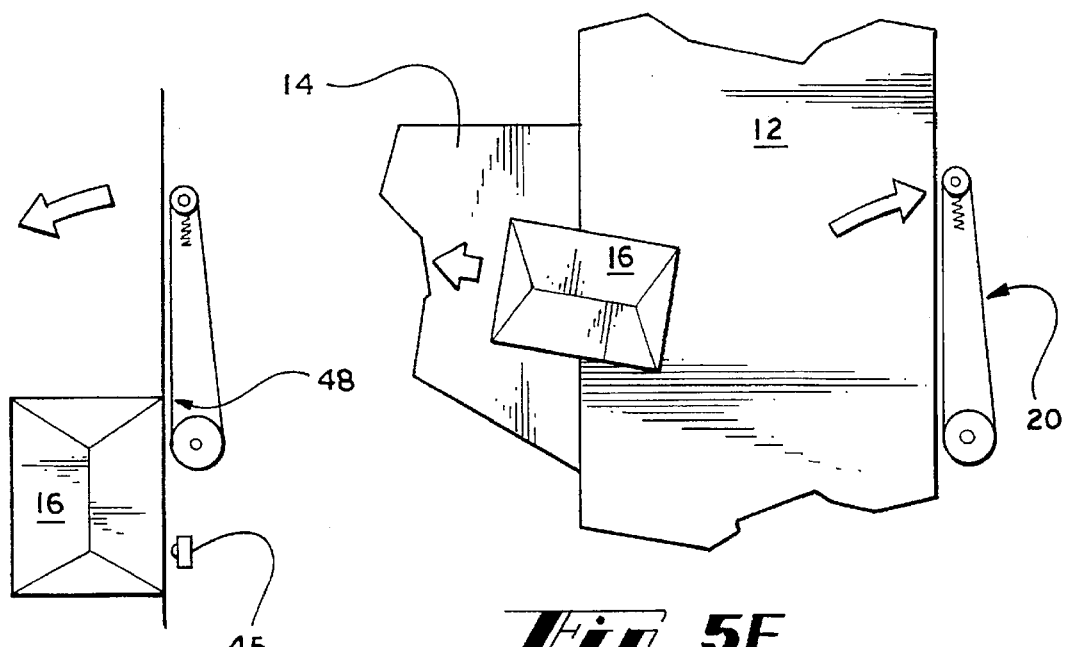
Fig_5E
Fig_5B
Fig_5D
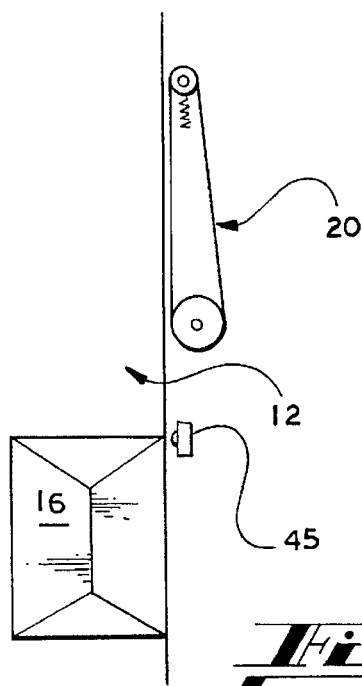
Fig_5A
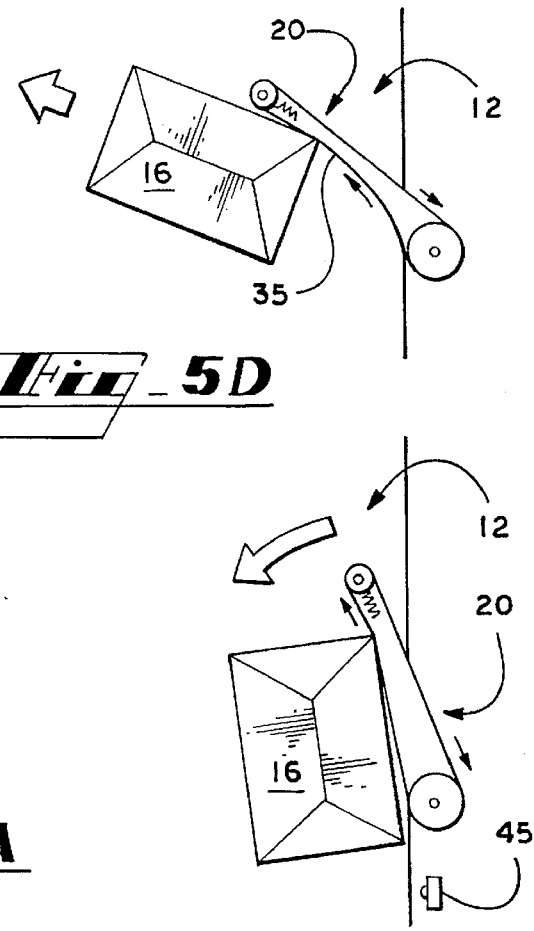
Fig_5C

HIGH SPEED, COMPOUND, BELTED DIVERTER AND METHOD OF OPERATING SAME

TECHNICAL FIELD

The present invention relates to material handling systems utilizing conveyors, and more particularly relates to a system for diverting packages or parcels from a conveyor to an output location such as another conveyor, a discharge chute or the like.

BACKGROUND ART

Package delivery companies pick up millions of packages daily from thousands of locations over a large geographical area and transport them, primarily by truck and airplane, to a correspondingly large number of scattered destinations. To meet a rigorous schedule and provide accurate deliveries, a package delivery company must use automated transfer systems to match incoming packages with proper outgoing transport headed for the packages' destinations. Because deliveries are time sensitive, the sorting equipment must be very fast, yet provide gentle handling of packages.

Belt and roller conveyor systems have often been used in package sorting systems to move packages from incoming loading docks to outgoing transport. A initial sort of packages traveling along a conveyor may be accomplished by diverting packages from the conveyor based on their destinations, or based on their size or another characteristic.

To automate handling of articles in conveyor systems, conveyor diverter assemblies of various types have been developed. Roller bed diverters are shown in U.S. Pat. No. 4,798,275 to Leemkuil et. al., and U.S. Pat. No. 4,174,774 to Bourgeois. Another approach has been to swing a diverter arm diagonally into the path of oncoming packages, which follow the angle of the arm into a side output destination. In some prior systems, an on-edge continuous belt is mounted on vertical-axis pulleys to move around the diverter arm. The movement of the belt moves the packages toward the output point. Examples of such systems are shown in U.S. Pat. No. 1,729,671 to Bell-Irving et. al., U.S. Pat. No. 4,711,357 Langenbeck et. al., and U.S. Pat. No. 4,364,465 to Kraft et al.

These belted diverter systems have not met the needs of a modern conveyor system operating at high speed, for example, 500 fpm (152.4 meters per min.). At such speeds, a package impacting on a diverter arm, whether belted or not, may be dataaged. Attempts to swing the arm out to knock the package off the conveyor may add to this impact. Also, if the swinging speed is set too fast, the arm may send light packages flying off the conveyor and over the output destination. Thus, there is a need in the art for a diverter system that can divert packages traveling at high speeds safely and reliably.

SUMMARY OF THE INVENTION

The invention seeks to provide a conveyor diverter that is capable of engaging objects, such as packages of varying size and weight, traveling at high speed along a conveyor, without dataaging impact, and can reliably divert such objects off the conveyor to an output location without any decrease in conveyor speed.

In accordance with the invention, these objects are accomplished by providing a conveyor diverter that yields upon contact with high speed packages to absorb their force and prevent dataaging impact, and imparts speed to the packages in the direction of an output location to one side of the conveyor.

Generally described the present invention provides a diverter for discharging articles from a moving conveyor, comprising means for swinging a diverter arm to engage articles passing on the conveyor; means associated with the diverter arm for absorbing contact of the articles against the diverter arm; and means for imparting movement along the diverter arm to the articles.

In a preferred embodiment, the diverter may comprise a frame pivotally mounted for rotation about an axis adjacent to the conveyor; a pair of pulleys positioned on the frame, one oil the pulleys being movably mounted and yieldably urged away from the other; a belt fitted on the pulleys; and means for driving the belt around the pulleys; the frame being shaped to allow a run of the belt facing articles approaching on the conveyor to deform upon contact by the articles. As the movable pulley is yieldably mounted, it will yield by an amount related to the mass of the object contacting the belt. This allows the belt to deform inwardly into a curved configuration, absorbing the force of the contact.

Furthermore, the preferred diverter may include means for sensing articles approaching on the conveyor and control means for rotating the diverter from a clear position to a discharge position beginning after the article passes a position along the conveyor at which the diverter is pivotally mounted. The initial swinging movement of the diverter may be relatively slow, so that it eases into the path of the article. After the article and diverter come into engagement with each other, the swinging speed of the diverter, and, optionally, the speed of the diverter belt, may be accelerated to increase the exit speed of the article.

The present invention also provides a conveyor sorting system incorporating a diverter as described above.

The present invention also provides a method of diverting articles from a conveyor, comprising the steps of rotating a diverter arm out over the conveyor to engage an article on the conveyor; increasing the speed of rotation of the diverter arm after the arm contacts the article; and imparting motion along the diverter arm to the article. In a preferred method, the contact of the article is absorbed by deforming the diverter arm responsive to the contact. Also, the step of imparting motion to the article along the diverter may comprise contacting the article with a moving belt, and preferably increasing the speed of the moving belt after the belt contacts the article.

Other objects, features and advantages of the invention will become apparent upon review of the following detailed description of preferred embodiments of the invention, when taken in conjunction with the drawings and the appended claims.

BRIEF DESCRIPTION OF THE DRAWINGS

FIG. 1 is a top plan view of a portion of a conveyor system including a diverter according to the present invention.

FIG. 2 is a side view of a portion of the conveyor system of FIG. 1.

FIG. 3 is a top view of a diverter according to the invention, prior to contact by a package.

FIG. 4 is a top view of a diverter according to the invention, during contact by a package.

FIGS. 5A–5E are diagrammatic representations showing the diverter arm at various positions in its cycle of operation.

FIG. 7 is a cut away view of a section of an alternative belt for the diverter.

DETAILED DESCRIPTION

Figure 6:
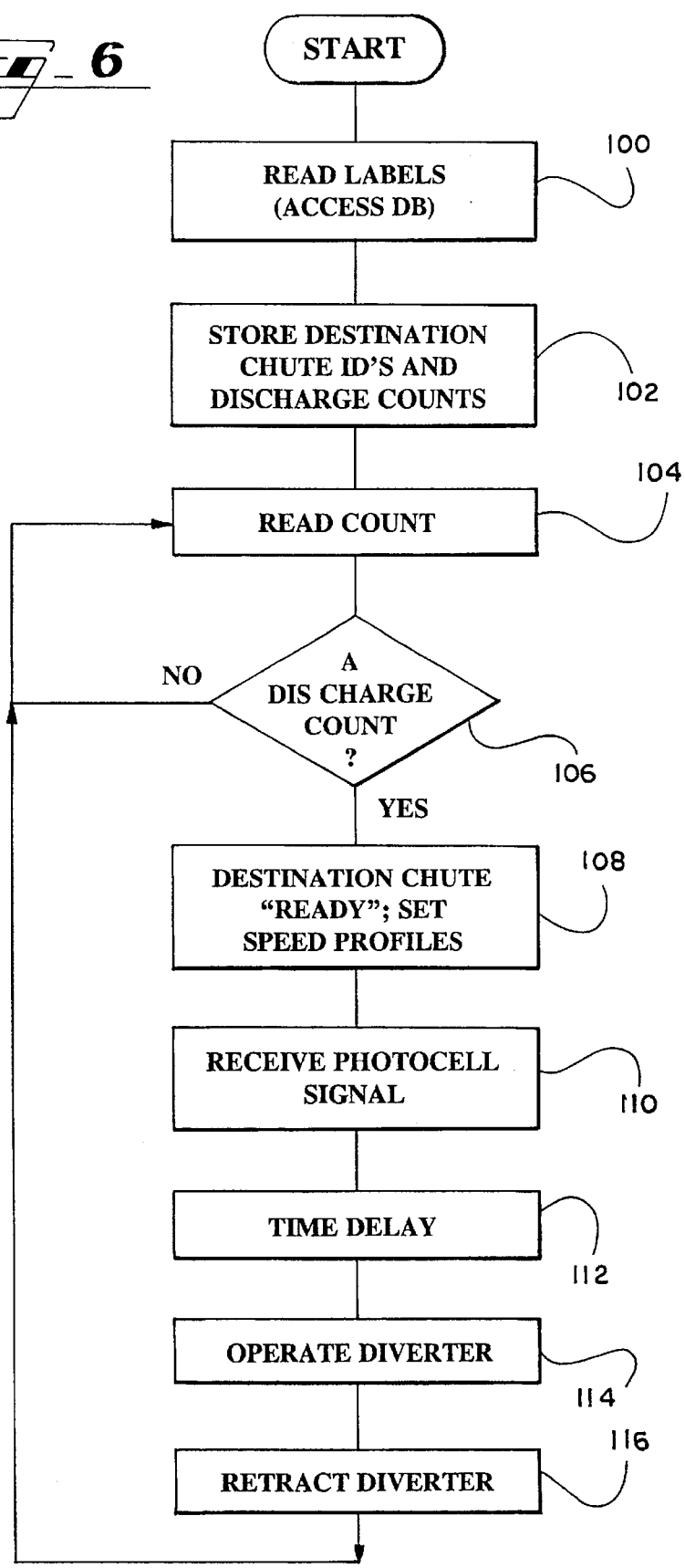
FIG. 6 is a flow diagram describing the sequence of operation of the diverter.

Referring now in more detail to the drawings, in which like numerals refer to like parts throughout the several views, FIG. 1 shows a conveyor system 10 embodying the present invention. The conveyor system includes a conveyor 12, which may be a belt, slat, roller or other type of conveyor. Packages 16, varying in size and weight, are carried along the conveyor 12. A number of discharge chutes 14 are positioned along the conveyor 12, and may be distributed on both sides of the conveyor. Opposite each discharge chute 14 a diverter assembly 20 is mounted along side the conveyor 12. As will be described in detail below, the purpose of the diverter assembly is to cause selected packages 16 to move laterally off the conveyor into a discharge chute 14 by swinging out to engage the packages at the appropriate time.

The diverting process is controlled by a digital controller 17, the function of which is described below with reference to FIG. 6. The controller may be a programmed general purpose personal computer or a programmable logic controller (PLC). The controller receives input from detectors associated with the diverter assemblies, as described below. Also, a label reader 18 or a manual input device is used to acquire and store destination data about each package as the package is placed onto the conveyor. A suitable system for imaging labels is shown in U.S. Pat. Nos. 5,291,564; 5,308, 960; 5,327,171; and 5,430,282 which are incorporated herein by reference. Systems for locating and decoding bar codes and the MaxiCode dense code symbology are described in U.S. Pat. Nos. 4,874,936; 4,896,029; 5,438, 188; 5,412,196; 5,412,197; 5,343,028; 5,352,878; 5,404, 003; 5,384,451 and PCT Publication No. WO 95/34043, respectively, all of which are incorporated herein by reference. A conventional encoder device 19 allows the controller to track how far the conveyor has traveled since any particular package was input onto the conveyor.

In a known manner, the controller determines when a package should be discharged. At such times, the controller provides control signals instructing diverters when to operate to transfer packages off the conveyor. However, the manner in which the controller instructs the diverters to operate is unique to the present invention.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory. A programmable logic controller (PLC) may be appropriate.

The diverter assembly 20 is constructed on a frame 22, and is shown in more detail in FIGS. 2-4. The elongate frame 22 supports a pair of pulleys for rotation about vertical axes: an inner drive pulley 24 and a movable, outer idler pulley 26. The outer pulley 26 is held by a yoke 28 that is fitted on a sliding mount (not shown) in the frame 22. A block 29 extends up from the frame 22 at a point spaced apart from the pulley 26. The yoke 28 is connected to the block 29 by a spring 30 in partial compression between the yoke and the block. Thus, the yoke 28 and pulley 26 can slide inwardly when sufficient force is exerted against the spring 30. The slide mount for the yoke can be of the type typically used for belt tension adjustment devices, such as shown in U.S. Pat. No. 4,711,357 Langenbeck et. al., and U.S. Pat. No. 4,364,465 to Kraft et al., both of which are incorporated herein by reference. The same type of tension adjustment device could be used to adjust the tension on the spring 30.

An endless belt 35 is carried in tension about the two pulleys 24 and 26. Preferably, the belt is cogged on both surfaces, and the pulleys are also cogged to positively drive the belt. The outer surface is cogged to provide high friction between the belt and the packages it contacts. As shown in FIGS. 3 and 4, the frame has a thin central portion defining a cutout 38 facing oncoming packages, to allow inward deflection of the belt 35. Pressure exerted by a package on the belt exerts force against the spring 30, causing the pulley 26 to move closer to the pulley 24. This allows the belt to deflect inwardly, absorbing the force of the contact with the package.

The pulley 24 and thereby the belt 35 are driven by a variable speed servo motor 37 mounted above the pulley 24 on a mounting structure 39 extending down to the frame 22. The motor 37 is coupled by a drive shaft 36 to the pulley 24. The servo control of the motor 37 is connected to the controller 17 to receive operating commands. The motor 37 preferably can vary the linear speed of the belt 35 from about 100 to about 1000 fpm (30 to 305 meters per min.). When the discharge chute is to the left of the direction of package motion, and the diverter assembly 20 is to the right, the motor drives the belt 35 in a clockwise direction when viewed from above. If the discharge chute is to the fight of the conveyor, the belt moves in a counter-clockwise direction.

The frame 22 of the diverter assembly 20 is pivotally mounted along the side of the conveyor 12 on a vertical pivot drive shaft 40. The shaft 40 is coupled to a variable speed, reversible, indexing servo motor 41 through a gear reducer 42. The motor 41 is mounted to a support structure (not shown). The motor 41 can be operated in response to commands from the controller 17 to swing the diverter frame 22 out over the conveyor 12 in a manner to be described in detail below. The portion of the diverter assembly 20 which swings out over the conveyor is sometimes referred to herein as the diverter arm.

A photocell detector (including an emitter 45 and a receptor 46) is mounted along the conveyor 12 adjacent to each diverter assembly 20. The detector is positioned at a precisely known distance prior to the diverter for the purpose of detecting the leading edge of packages moving toward the diverter. The packages break a beam directed between the emitter and receptor in a well known manner. When the beam is disrupted, a signal is transmitted to the controller 17.

Operation of the conveyor system 10 will now be described with reference to the flow diagram of FIG. 6. Prior to the steps to be described, the packages are placed, or automatically arranged, in single file along the right hand edge of the conveyor 12 as viewed in FIG. 1. An example of a device for "singularizing" boxes on a conveyor system is shown in U.S. Pat. No. 5,372,238, which is incorporated herein by reference. Also, each package may be weighed and measured, as shown, for example, in U.S. Pat. No. 5,484, 049, which is incorporated herein by reference. Or, the package may be measured and a weight estimated based on its dimensions. A record of these measurements may be stored with a package identification in a computer memory associated with the controller.

It may be advantageous to utilize a variable speed feed conveyor (not shown) in advance of the conveyor 12 to adjust the spacing between the packages based on their size and/or weight. The spacing between packages may be coordinated with the operation of the diverter assembly 20 in a manner described below.

As the packages 16 move along the conveyor 12, they pass under the imaging camera of the label reader 18. At step 100 of the flow diagram of FIG. 6, the reader 18 obtains an image of information on a label on the package 16. Any bar codes or other symbols on the label are detected and decoded. Destination information may be embedded in a dense code, or may be stored in a database location the address of which is contained in a bar code. Furthermore, textual address information on the label can be analyzed using OCR techniques. If the weight and dimensions of the package have previously been encoded in a dense code label on the package, this information may be obtained from the label image as an alternative to weighing and measuring at the time the package enters the conveyor system 10. When a package is imaged at the reader 18, the current count of the encoder is obtained.

A stored record for each package now may contain the package identification, destination address, and package characteristics. In addition to the dimensions and weight, other characteristics may be stored, such as a description of the contents of the package or a code indicating the contents are fragile or hazardous or have some other special status.

Once the destination information for the package is known, the controller 17 looks up in an appropriate part of its memory the proper output chute corresponding to the package's destination, and the number of encoder counts between the label reader 18 and an activation location a short distance prior to the destination output chute. The activation location is between the previous output chute and the photocell detector 45/46 associated with the destination output chute. This number of counts is added to the current encoder count to obtain the discharge count for the package, which at step 102 is stored with the destination chute identification. Preferably, this information is stored in fields of the record already created for the package.

The controller reads the encoder count at step 104 as the conveyor 12 travels. At step 106, the controller compares the encoder count to the list of discharge counts stored in memory. When the controller receives a discharge count, at step 108 it reads the associated destination chute identification, sends a signal to put the corresponding diverter assembly 20 in a ready state, and sets the diverter swing speed and belt speed profiles depending on the size and weight information stored for the package that is approaching the diverter.

Then, when the photocell 45/46 just prior to the destination chute is triggered by the leading edge of the package, as shown in FIG. 5A, a signal is sent to the controller at step 110. This begins a time (or encoder count) delay at step 112, during which the diverter remains in the clear position shown in FIGS. 5A and 5B. The time (or count) delay is set, based on the time (or distance) required for the leading edge of the package to reach a point 48 along the diverter assembly 20, spaced beyond the pivot shaft 40, as shown in FIG. 5B. Responsive to the time delay timing out, at step 114 the diverter motor 41 begins to swing the diverter out over the conveyor 12 according to the set speed profile.

FIG. 5C shows the package and diverter shortly after the diverter begins to swing out. As the front corner of the package engages the belt 35, the force of the package on the belt causes the pulley 28 to move toward the pivot shaft 40 against the spring 30. This allows the belt to deform inwardly to cushion the package. In combination, the swing speed of the diverter 20 and the speed of the belt 35 increase to impart a velocity to the package diagonally across the belt 12 to the destination output chute 14.

According to the present invention, speed profiles for the swinging motion of the diverter 20 and for the travel of the belt 35 are stored in the controller memory. These profiles may be established and modified as required to safely and rapidly discharge the various types of packages that are being handled by the conveyor system 10. Multiple profiles may be stored, corresponding to packages having different weights or dimensions. In this case, at step 108 as described above, the proper speed profiles that fit the characteristics of a particular package are set at the destination chute diverter 20 when that package approaches.

The speed profiles for the swinging motion of the diverter 20 preferably begin relatively slowly to minimize any impact of the diverter on the package. The diverter and its belt 35 may better be described as catching the package rather than hitting it. The diverter preferably does not swing out in advance of the arrival of the package, because this could result in a harsh impact when a package is moving at high speed. The package, traveling along the conveyor edge closely adjacent to the diverter, is engaged by the initial movement of the diverter when the front corner of the package has traveled beyond the inner pulley 24. As the force of the package is absorbed, as described above, the swinging speed is accelerated, imparting a transverse component to the velocity of the package. The swinging speed preferably is variable from about 100 fpm (30 meters per min.) and accelerates to about 1000 fpm (305 meters per min.) when the package leaves contact with the diverter.

At the same time, the speed of travel of the belt 35 about the pulleys preferably is accelerated. The cogs of the belt grip the package as the belt adds to the speed of the package along the diverter. FIG. 5D shows the diverter arm approaching its discharge position with the package about to reach maximum transverse velocity. At the time the package leaves contact with the diverter, it has sufficient transverse speed to be discharged from the conveyor into the discharge chute, as shown in FIG. 5E. The belt speed on engagement with a package preferably may range from about 500 fpm (152 meters per min.) and the speed gradually increases to about 1000 fpm (305 meters per min.) when the package leaves contact with the belt. Then the speed decreases to the initial speed as the diverter arm retracts.

During this process, the high conveyor speed has not been reduced. If a package has characteristics leading to the selection of a slower operation of the diverter, compensation may be made by increasing the spacing along the belt to the next package. Conversely, when the characteristics of a package call for faster diverter operation, the spacing may be decreased. As the characteristics are known when the package is measured, such spacing may be done automatically by a variable speed feed conveyor as described above.

At step 116 the diverter rapidly retracts preferably at full swinging speed to be ready for another package. The logic flow returns to step 104 to read encoder counts until another discharge count occurs.

FIGS. 1 and 5 show discharge chutes positioned on the left side of the conveyor 12. A mirror image of the configuration shown in these Figures may be provided to divert packages to the right side of the conveyor.

The chutes 14 preferably are inclined down and away from the conveyor 12 so that packages entering the chutes will slide away from the conveyor and to a desired destination under the force of gravity. Those skilled in the art will understand that the discharge chutes form output locations that may be provided also by output conveyors, collection receptacles, or other appropriate structures.

An alternative structure for a belt 55 to replace the belt 35 is shown in FIG. 7. The belt is a tube having a semi-circular cross section, and defines a chamber 56 inflated with air. The inflated belt 55 helps to cushion the engagement of the diverter with packages approaching on the conveyor. The flat portion of the cross section can be formed with cogs 57 to engage a cogged drive pulley. The chamber 56 preferably is inflated through a conventional port (not shown) which then can be sealed to prevent leakage. Rather than being inflated, the belt may also be constructed of a foam, a thick rubber of relatively low density, or some other cushioning material. The belt 55 preferably is at least 2 inches (5 cm) thick.

It thus will be seen that the operation of the present invention differs from prior diverters which may have "knocked" items off a conveyor with a swinging impact, or may have provided a belted barrier to stop the item and then move it transversely solely by action of the belt. The diverter of the present invention engages the package without potentially dataaging impact, and utilizes a combination of a swinging diverter arm and a moving belt to impart the proper velocity vector to the package to move it into a discharge location.

Those skilled in the art will understand that the apparatus and method of the present invention can be adapted for sorting or diverting various types of items other than packages.

While this invention has been described in detail with particular reference to a preferred embodiment thereof, it will be understood that modifications and variations may be made without departing from the scope of the invention as defined in the appended claims.

What is claimed is:

1. A conveyor system, comprising:
   a conveyor defining a path along which articles on said conveyor are carried; and
   a diverter mounted adjacent to said conveyor opposite a discharge location at which selected articles are discharged from said conveyor, said diverter being pivotally mounted for movement from a clear position beside said path to a discharge position across said path;
   said diverter comprising:
      a frame;
      a pair of pulleys positioned on said frame;
      a belt fitted on said pulleys; and
      means for driving said belt around said pulleys;
   said frame defining a recess behind a run of said belt facing articles approaching on said conveyor, said run of said belt deforming into said recess under the force of an article contacting said diverter by an amount responsive to the force of said article on said belt.

2. The conveyor system of claim 1, further comprising control means for rotating said diverter from said clear position to said discharge position at a speed of rotation accelerating through a selected range of motion of said diverter.

3. The conveyor system of claim 1, further comprising:
   control means for rotating said diverter from said clear position to said discharge position; and
   means for sensing said article;
   and wherein said control means begins rotating said diverter at a time after said article passes a position along said conveyor at which said diverter is pivotally mounted.

4. A diverter for discharging articles from a moving conveyor, comprising:
   a frame pivotally mounted for rotation about an axis adjacent to said conveyor;
   a pair of pulleys positioned on said frame, one of said pulleys being movably mounted and yieldably urged away from the other pulley;
   a belt fitted on said pulleys; and
   means for driving said belt around said pulleys;
   said frame being shaped to allow a run of said belt facing articles approaching on said conveyor to deform upon contact by said articles.

5. The diverter of claim 4, further comprising control means for rotating said diverter out over said conveyor at a speed of rotation increasing as said diverter rotates.

6. The diverter of claim 5, further comprising means for sensing said article, and wherein said control means begins rotating said diverter at a time after said article passes said axis of rotation.

7. The diverter of claim 4, further comprising means for sensing said article, and control means for rotating said diverter at a time after said article passes said axis of rotation.

8. The diverter of claim 4, wherein said movable pulley moves a variable distance depending on the mass of each article contacting said diverter.

9. The diverter of claim 4, wherein said belt comprises an inflated tube.

10. The diverter of claim 4, wherein said belt comprises a compressible material having a thickness of at least about 5 cm.

11. The diverter of claim 4, wherein at least one of said pulleys is cogged, and wherein said belt is cogged on both surfaces thereof.

12. The diverter of claim 4, wherein said means for driving said belt comprises a motor coupled to drive one of said pulleys to move said belt at a variable linear speed in a range from 100 to 1000 fpm (30–305 meters per min.).

13. The diverter of claim 4, further comprising a memory containing characteristics of articles moving along said conveyor; and a controller for selecting a speed of rotation of said frame, responsive to said stored characteristics of each article approaching said diverter.

14. The diverter of claim 13, wherein said controller selects a speed of said belt around said pulleys, responsive to said stored characteristics of each article approaching said diverter.

15. The diverter of claim 14, wherein said controller accelerates the speed of rotation of said frame and the speed of said belt around said pulleys throughout a selected movement of said diverter frame out over said conveyor, responsive to said stored characteristics of each article approaching said diverter.

16. A diverter for discharging articles from a moving conveyor, comprising:

means for swinging a diverter arm to contact articles passing on said conveyor;

said diverter arm comprising:

a pair of pulleys positioned on said diverter arm, one of said pulleys being movably mounted and yieldably urged away from the other pulley;

a belt fitted on said pulleys; and means for driving said belt around said pulleys;

said diverter arm being shaped to allow a run of said belt facing articles approaching on said conveyor to deform upon contact by said articles.

17. The diverter of claim 16, wherein said deforming run of said belt absorbs force of contact of said articles.

18. A method of diverting articles from a conveyor, comprising the steps of:

rotating a diverter arm out over said conveyor to contact an article on said conveyor;

accelerating the speed of rotation of said diverter arm after said arm contacts said article through a range of movement of said arm; and imparting motion along said diverter arm to said article.

19. The method of claim 18, further comprising the step of absorbing the contact of said article by deforming said diverter arm responsive to said contact.

20. The method of claim 19, wherein said step of imparting motion to said article along said diverter comprises contacting said article with a moving belt, and further comprising the step of increasing the speed of said moving belt after said belt contacts said article.

* * * * *